Dec. 24, 1940.　　　　　E. MARTIN　　　　　2,226,316
PROPELLER CONTROL MEANS
Filed June 11, 1937　　　2 Sheets-Sheet 1

INVENTOR.
Erle Martin
BY Harris G. Luther
ATTORNEY

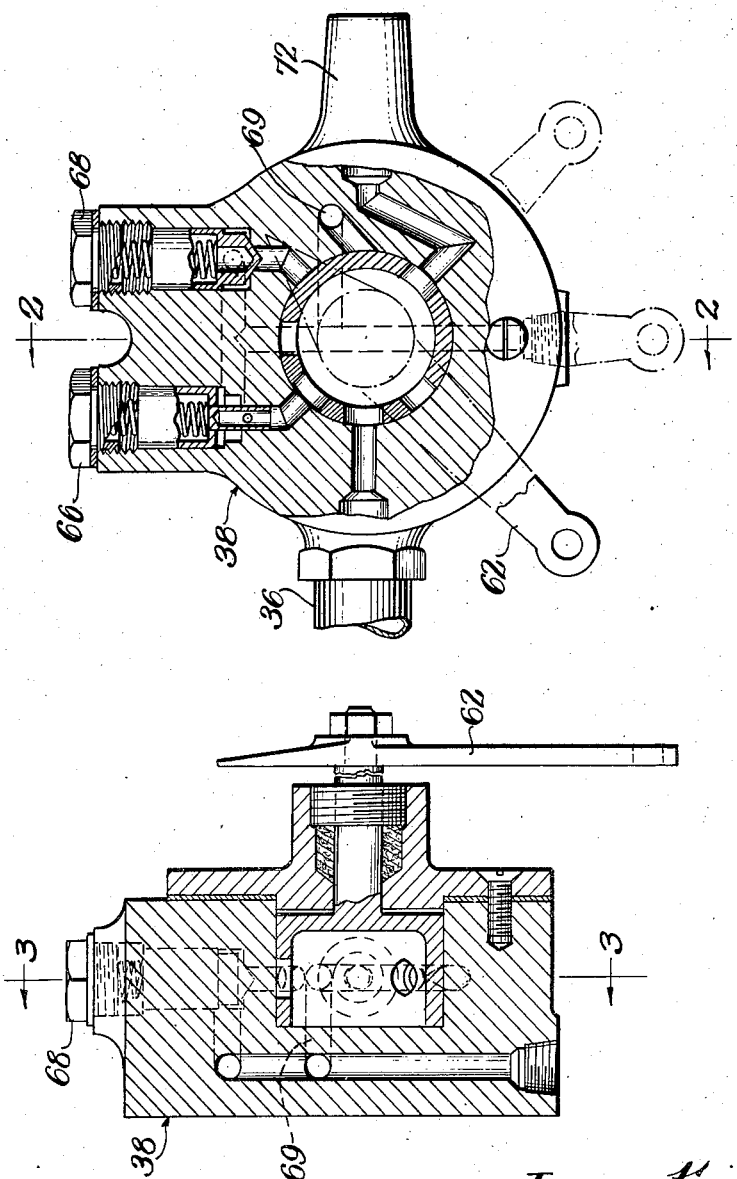

Patented Dec. 24, 1940

2,226,316

UNITED STATES PATENT OFFICE 2,226,316

PROPELLER CONTROL MEANS

Erle Martin, West Hartford, Conn., assignor to United Aircraft Corporation, East Hartford, Conn., a corporation of Delaware Application June 11, 1937, Serial No. 147,651

12 Claims. (Cl. 170—163)

This invention relates to improvements in control means for aeronautical propellers and has particular reference to control means for propellers of the controllable pitch type having at least two operative ranges of pitch adjustment.

An object of the invention resides in the provision of improved means of the character specified by means of which a controllable pitch aeronautical propeller having at least two ranges of pitch adjustment may be changed from its usual operative or working range of pitch adjustment and moved to a pitch setting in a different range of pitch adjustment such as a feathering range, and returned from such extreme pitch setting to its working range at the will of the operator of the vehicle upon which the propeller is mounted.

A further object resides in the provision of an improved propeller control means for feathering and unfeathering a controllable pitch propeller.

A still further object resides in the provision of an improved propeller control means of the character specified utilizing gas under pressure to operate an hydraulically operated controllable pitch propeller through at least a portion of its entire range of pitch changing movements.

Other objects and advantages will be more particularly pointed out hereinafter or will become apparent as the description proceeds.

In the accompanying drawings, in which like reference numerals are used to designate similar parts throughout, there is schematically illustrated a suitable application of the idea of the invention to a controllable pitch aeronautical propeller and a propeller driving engine. The drawings, however, are for the purpose of illustration only and are not to be taken as limiting the invention the scope of which is to be measured entirely by the scope of the appended claims.

In the drawings Figure 1 represents a fragmentary schematic elevational view of a controllable pitch propeller having at least two operative ranges of pitch adjustment and a propeller driving engine, and a propeller control means constructed according to the idea of this invention applied thereto, certain portions of the engine and control means being broken away and shown in section to better illustrate the construction thereof.

Fig. 2 is a sectional view of the valve 38 taken on the line 2—2 of Fig. 1, and

Fig. 3 is a partly sectional view of the same valve taken on the line 3—3 of Fig. 2.

Figure 1:
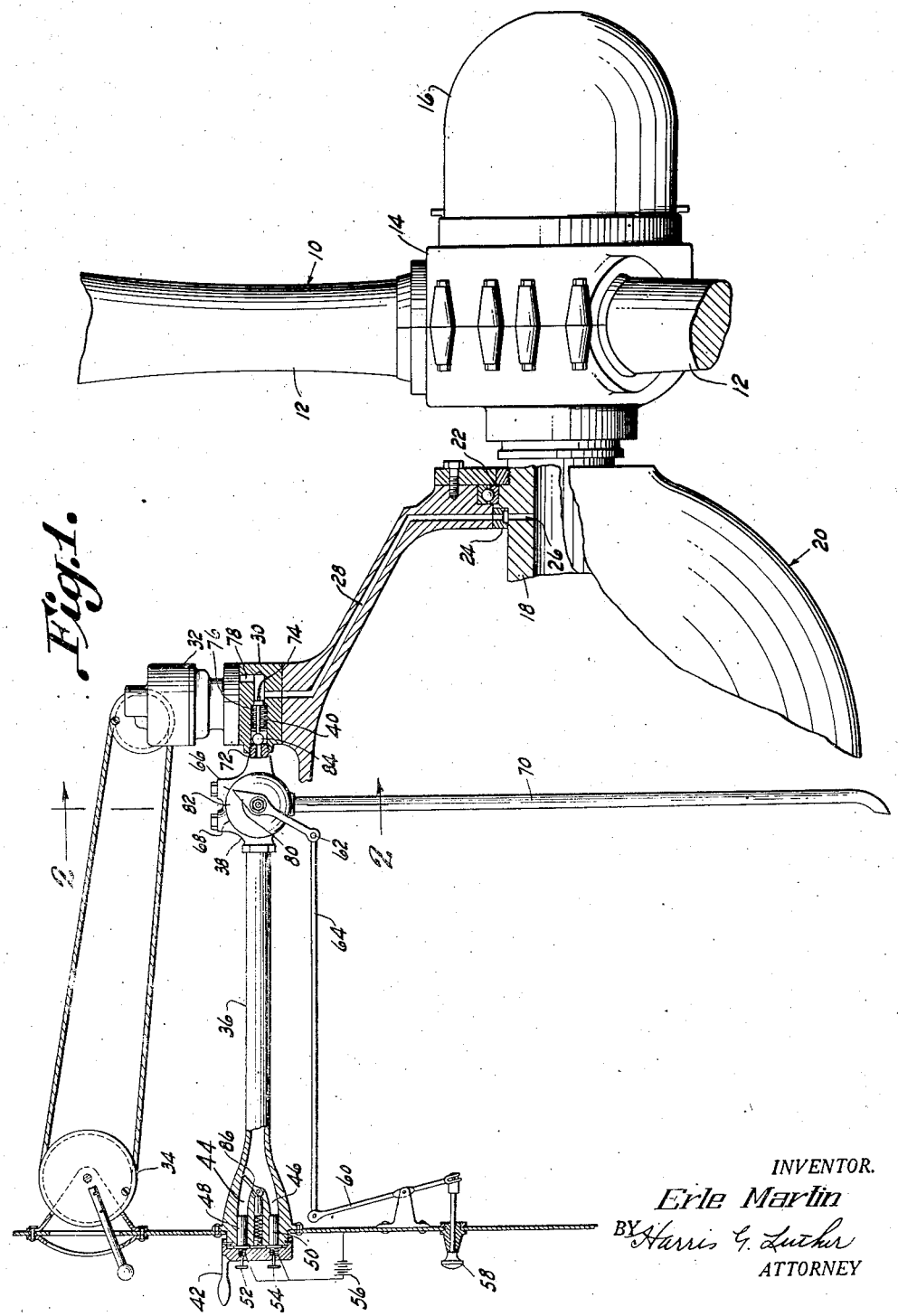

In the drawings the numeral 10 generally indicates a controllable pitch aeronautical propeller of the type having at least two ranges of pitch adjustment. The propeller has a plurality of blades 12, rotatably mounted in a hub portion 14 and operatively connected with a blade pitch controlling mechanism enclosed in a cover member or cylinder 16. The pitch controlling mechanism of the propeller 10 is not illustrated as various forms of such mechanism could be used in combination with the novel control means forming the subject matter of this invention the only qualification being, that, since the control means relies upon the application of fluid under pressure to the propeller to control the pitch changing movements thereof, the propeller pitch controlling means must be of a type adapted to be actuated by fluid under pressure. Two examples of fluid actuated propeller pitch controlling devices suitable for use with the improved control means forming the subject matter of this invention are illustrated and described in application Ser. No. 94,202 of Erle Martin et al., filed August 4, 1936 for Feathering type propeller, and application Ser. No. 147,972, filed June 12, 1937, by Erle Martin et al. for Feathering propeller.

It is to be understood however, that the improved control means is not limited in its application to the two forms of controllable pitch propellers illustrated and described in the above identified applications, but may be applied to various other controllable pitch propellers adapted to be operated by fluid under pressure. The propeller 10 is mounted upon the projecting end of a hollow crankshaft or propeller shaft 18, of the engine generally indicated at 20. At the point where it projects from the engine, the shaft 18 is carried in a suitable anti-friction bearing 22 adjacent to which is an oil feed ring 24, connected with port 26 extending to the hollow interior of the shaft 18, and with a channel 28 leading through the adjacent portion of the engine from some fluid supply or control element such as the governor base 30. By this arrangement fluid under pressure may be supplied through the channel 28, the oil feed ring 24 and port 26 to the hollow interior of the shaft 18 from which it is supplied to the propeller pitch actuating mechanism contained in the cover member 16. The propeller 10 is preferably of the type in which the blades 12 are turned in one direction of pitch changing rotation by the action of centrifugal forces exerting twisting moments on the blades during rotation of the propeller by the shaft 18, and are turned in the opposite direction of pitch changing rotation by the application of fluid under pressure to the fluid actuated mechanism.

The pitch of such a propeller is controlled by the flow of fluid under pressure to and from the fluid actuated mechanism through the channel as indicated above.

In the arrangement illustrated the pitch of the propeller 10 may be controlled in the ordinary operative or working range of pitch adjustment by suitable means such as the speed responsive governor 32 and the manual control device 34. As such an arrangement is well-known to the art, it is believed that a detailed description thereof is not necessary for the purpose of this disclosure. For a complete disclosure of a suitable mechanism for controlling the propeller pitch in the ordinary working range reference may be had to application Ser. No. 25,614 filed June 8, 1935, by F. W. Caldwell for Control means for controllable propellers, or application Ser. No. 8908 filed March 1, 1935, by E. E. Woodward for Automatic pitch control for airplane propellers.

In general propeller pitch controlling devices of the character specified make use of hydraulic fluid under pressure such as the engine lubricating oil. Pressure is supplied to such fluid by some suitable device such as the engine lubricating pump, and additional pressure may be applied by means of one or more booster pumps located at favorable positions in the fluid line between the engine oil pressure pump and the oil feed ring 24. The speed responsive governor 32 actuates a fluid controlling valve which may conveniently be disposed in the governor base 30 at the beginning of the channel 28. The governor 32 is positively driven by the engine 20 and controls the supply of hydraulic fluid to the propeller in the well-known manner indicated above, to change the pitch of the propeller blades in response to variation in the speed of the engine to maintain the engine speed substantially constant by varying the load imposed on the engine by the propeller. The setting of the governor 32 may be controlled by the manual control device 34, or by means of the manual control device the governor may be rendered inoperative and the propeller pitch maintained at either limit of the working pitch range as is well-known to the art and set forth in the applications referred to above.

Under certain circumstances it may be desirable to turn the propeller blades to a pitch setting beyond the range of the normal working range controlled by the speed responsive governor, as in the case of a multi-motored airplane, where it may be desired to turn the blades to a feathered condition so that the airplane may operate on less than the total number of engines with which it is equipped without encountering serious drag effects from the propellers of the inoperative engine or engines.

The present invention contemplates the provision of light weight, simple and effective means for moving the propeller to a pitch setting beyond the range of normal pitch adjustment.

In order to move a propeller of the character specified to a pitch setting beyond the normal working range of pitch adjustment it is necessary to apply to the fluid actuated pitch regulating mechanism, fluid at a pressure higher than the pressure of the fluid supplied to the pitch regulating mechanism for pitch control in the working range, and to return the propeller to the working range from an extreme pitch setting, it is necessary to supply fluid to the pitch regulating mechanism at a still higher pressure.

In the present invention a combustion chamber or high pressure fluid container 36 is connected with the channel 28 through a three-way pressure regulating valve 38 and a pressure responsive selector valve 40. The container 36 has one end located in a position convenient to the operator of the vehicle and is there provided with a breach mechanism 42 and cartridge chambers 44 and 46 for the reception of combustible cartridges 48 and 50. The cartridges may be fired by suitable means such as the manually actuatable electric switches 52 and 54 mounted in the breach mechanism opposite the respective cartridges and connected with a suitable source of electrical energy, such as the battery 56.

The three-way valve 38 is operated by a manual control device 58 operatively connected therewith by suitable means such as the levers 60 and 62 and link 64. The valve 38 is provided with pressure relief devices, as indicated at 66 and 68, one of which, for instance the device 66, is set for a pressure which is effective to turn the propeller blades to the extreme pitch setting and the other is set for a pressure effective to return the blades from the extreme pitch setting to the working range of pitch settings. The valve is also provided with means 69 by which the pressure can be entirely relieved from the container 36. In operation when the valve is set for either of the pressure release mechanisms 66 and 68 and one or more of the cartridges, as indicated at 48 and 50, is fired into the combustion chamber, the excess pressure of the fluid produced by the combustion of the cartridge will be released by the pressure relief device through the vent tube 70, and fluid at the desired pressure will be maintained in the container 36 and at the fluid exit aperture 72 of the valve 38. Since the pressure of the fluid as regulated by the pressure relief devices 66 and 68 is above the pressure of the fluid under the control of the governor 32, the fluid flowing from the aperture 72 will act upon the pressure responsive valve 40 to move the plunger 74 against the resistance of the spring 76 to a position in which the plunger connects the aperture 72 with the end of the channel 28 and simultaneously cuts off the channel 78 leading from the governor control valve to the end of the channel 28. The fluid from the chamber 36 will then flow from the valve 38 through the channel 28 and the hollow interior of the shaft 18 to the fluid actuated pitch regulating mechanism to move the propeller blades to or from the extreme pitch setting.

After the blades have been returned to the working range of pitch setting from the extreme pitch setting the high pressure fluid used to actuate the propeller pitch actuating mechanism for the return movement will remain in the piston and retain the blades at the flat pitch end of the working range until such high pressure fluid is released by manipulation of the valve 38 to the pressure release or drain setting, in which the pointer 80 coincides with the setting indicator 82. At this setting of the valve the high pressure fluid in the chamber 36 drains through the vent tube 70 and the valve 40 changes its position so that the plunger 74 moves to the position indicated in the drawing, in which the channel 28 is connected with the channel 78, and the check ball 84 moves to a position closing the end of the aperture 72. The high pressure fluid in the pitch regulating mechanism will then vent through the channel 28 and the governor actuated valve to the interior of the engine from which it will vent to the atmosphere by a suitable engine breather tube.

The chambers 44 and 46 may if desired be reloaded for each actuation of the propeller or may, alternatively be loaded at one time for a complete cycle of propeller operation to and from an extreme pitch condition. Thus in the construction illustrated one of the cartridges 48 or 50 may be fired to move the propeller from the working range of pitch setting to an extreme pitch setting, in which case the reserve cartridge is desirably protected by suitable means such as the flap valve 86, to prevent firing of the reserve cartridge by the action of the cartridge being fired. For reloading the pressure is released from the chamber or container 36 by proper manipulation of the valve 38, the breech 42 is removed, fresh cartridges are inserted and the breech replaced. The breech is removably secured to the cartridge chamber end of the member 36 by suitable breech retaining means well-known in the gun art.

From the above description it will be observed that there has been provided in combination with a controllable pitch propeller having an operating range of pitch settings and an extreme pitch setting, means for controlling the setting of the propeller blades in the operative or working range according to a certain predetermined function, such as constant engine speed, and in addition, light weight, simple and effective means for moving the propeller blades from the working range to an extreme pitch setting and returning the blades to the working range at the will of the operator of the vehicle upon which the propeller is mounted.

While there has been illustrated and described a suitable mechanical embodiment of what is now considered to be the preferred form of the idea of the invention, it is to be understood that the invention is not limited to the schematic constructional arrangement so illustrated and described but that such changes in the size, shape and arrangement of parts may be resorted to as come within the scope of the appended claims.

Having now described the invention so that others skilled in the art may clearly understand the same, what it is desired to secure by Letters Patent is as follows:

1. Control means for a controllable pitch propeller having a fluid actuated device responsive to different operative fluid pressures to change the pitch of said propeller in opposite directions comprising, a fluid pressure chamber operatively connected with said device, means in said chamber for producing fluid pressure by chemical reaction of fluid producing materials, and means for maintaining the pressure in said chamber at either operative fluid pressure of said device.

2. Propeller pitch control means for changing the pitch of a controllable pitch propeller from a normally operative range of pitch settings to a pitch setting beyond said range of normal operation comprising, a fluid pressure container connected by fluid passages with said propeller, means in said container for creating fluid pressure by the combustion of fluid producing material, and means for maintaining the pressure of the fluid in said container at any selected one of several pre-determined values.

3. Propeller pitch control means for changing the pitch of a fluid actuated controllable pitch propeller operative when subjected to one fluid pressure to function in a normal operative range of pitch settings, when subjected to a second pressure to go to an extreme pitch setting beyond said normal range of pitch setting and when subjected to a third pressure to return from said extreme pitch setting to said normally operative range of pitch setting comprising, a fluid pressure container connected by fluid passages with said propeller, means for creating fluid pressure in said container by the combustion of fluid producing materials, and means for maintaining the pressure of the fluid in said container at either selected one of said second or third fluid pressure values.

4. Propeller pitch control means for changing the pitch of a controllable pitch propeller from a normally operative range of pitch settings to an extreme pitch setting beyond the range of normal operation and for returning said propeller from said extreme pitch setting to said normally operative range of pitch settings comprising, a fluid pressure container connected by fluid passages with said propeller, means for creating fluid pressure in said container by the combustion of fluid producing materials, and a manually operable three-way valve connected with said fluid container having two regulating devices for securing either of two separate pressures in said container and a pressure venting device and a separate setting for each device.

5. Propeller pitch control means for changing the pitch of a controllable pitch propeller from a normally operative range of pitch settings to an extreme pitch setting beyond said range of normal operation and for returning said propeller from said extreme pitch setting to said normally operative range of pitch settings comprising, a fluid pressure container having a cartridge chamber and a breech mechanism at one end thereof, and a pressure regulating valve at the opposite end thereof, connected with said propeller by fluid passages.

6. Propeller pitch control means for changing the pitch of a controllable pitch propeller from a normally operative range of pitch settings to an extreme pitch setting beyond said range of normal operating and for returning said propeller from said extreme pitch setting to said normally operative range of pitch settings comprising, a fluid pressure container having a plurality of cartridge chambers in one end thereof, means adjacent to said chambers for protecting reserved cartridges from the effect of fired cartridges, a breech mechanism on said container closing said cartridge chambers, means for separately firing said cartridges, and a pressure regulating valve at the end of said container opposite said cartridge chamber connected with a fluid passage leading to said propeller.

7. Propeller pitch control means for changing the pitch of a controllable pitch propeller from a normally operative range of pitch settings to an extreme pitch setting beyond said range of normal operation and for returning said propeller from said extreme pitch setting to said normally operative range of pitch settings comprising, a pressure fluid container having cartridge chambers in one end thereof, a manually removable and attachable breech mechanism connected to said container for closing said cartridge chambers and permitting loading thereof, a pressure regulating valve at the end of said container opposite said cartridge chambers and a fluid passage connecting said valve with said propeller.

8. Propeller pitch control means for changing the pitch of a controllable pitch propeller in a normally operative range of pitch settings and for changing the pitch to an extreme pitch setting beyond said range of normal operation and for returning said propeller from said extreme pitch setting to said normally operative range of pitch settings comprising, a pitch changing fluid motor, a source of relatively low pressure fluid for operating said motor in said normally operative range of pitch settings, a high pressure fluid container, means for producing high pressure fluid in said container by the combustion of fluid producing material, means connected with a fluid passage leading from said chamber to said propeller for regulating the pressure of the fluid in said container, and a pressure responsive valve in said fluid passage for changing the connection of said passage from said low pressure fluid source to said high pressure fluid container when said high pressure fluid is produced in said chamber.

9. Propeller pitch control means for changing the pitch of a controllable pitch propeller from a normally operative range of pitch settings and for changing the pitch to an extreme pitch setting beyond said range of normal operation and for returning said propeller from said extreme pitch setting to said normally operative range of pitch settings comprising, a pitch changing fluid motor, a source of relatively low pressure fluid for operating said motor in said normally operative range of pitch settings, a high pressure fluid container, means for producing high pressure fluid in said container by the combustion of fluid producing materials, a fluid passage leading to said propeller, a valve connected with said passage for regulating the pressure of the fluid in said container, and a pressure responsive valve in said passage for blocking said passage from said source of low pressure fluid when high pressure fluid is contained in said container.

10. Propeller pitch control means for changing the pitch of a controllable pitch propeller from a normally operative range of pitch settings in which the pitch is controlled by fluid under pressure from a low pressure source to an extreme pitch setting beyond the range of normal operation and for returning said propeller from said extreme pitch setting to said normally operative range of pitch settings comprising, a high pressure fluid container, means for creating fluid pressure in said container by the combustion of fluid producing material, a valve for regulating the pressure of the fluid in said high pressure fluid container connected with a passage leading to said propeller, and a pressure responsive valve in said passage comprising a plunger member for blocking said passage from said source of low pressure fluid when high fluid pressure is created in said container, and a check portion for restraining fluid under pressure against entering said high pressure fluid container from said low pressure source or said propeller.

11. Propeller pitch control means for changing the pitch of a fluid actuated controllable pitch propeller comprising, a fluid motor operative when subjected to fluid pressures limited within a pre-determined range to change the propeller pitch within a pre-determined limited range of pitch angles, when subjected to a second pre-determined pressure above said pre-determined pressure range to produce an extreme pitch setting beyond said limited range of pitch angles, and when subjected to a third pre-determined pressure to return said propeller from said extreme pitch setting to said limited range of pitch angles, means for supplying fluid to said motor at pressures within said limited pressure range, means for supplying fluid to said motor at said second and third pressures including a fluid container, means for charging said container by the combustion of fluid producing materials therein, means for selectively maintaining the fluid pressure in said container at either one of said second or said third pressures, means including a fluid passage between said container and said motor and a valve operatively associated with said passage for selectively connecting said container with said motor, and a pressure actuated valve operatively associated with said passage to block said limited pressure fluid supplying means from said motor when said container is connected with said motor.

12. Control means for a controllable pitch propeller comprising, a pitch changing fluid motor operative to change the propeller pitch within a pre-determined limited range of pitch angles when supplied with fluid under pressures not exceeding a pre-determined value and to change the propeller pitch beyond said limited range when supplied with fluid at pressures exceeding said pre-determined value, a fluid pump for supplying fluid at pressures below said pre-determined value, means including a pressure chamber, means for introducing combustible materials into and firing said materials in said chamber to charge said chamber with high pressure fluid, and valve means for regulating the fluid pressure in said chamber, and a fluid passage connecting said chamber with said fluid motor for supplying said motor with fluid at pressures above said pre-determined value, and a pressure actuated valve in said passage to block said pump from said motor whenever high pressure fluid is being supplied to said motor from said pressure chamber.

ERLE MARTIN.